2 Sheets—Sheet 1.

J. BARNES.
Harvester-Rake.

No. 208,950. Patented Oct. 15, 1878.

2 Sheets—Sheet 2.

J. BARNES.
Harvester-Rake.

No. 208,950. Patented Oct. 15, 1878.

Witnesses.
A. O. Behel.
Israel Sovereign

Inventor.
John Barnes
Per Jacob Behel.
Atty.

UNITED STATES PATENT OFFICE.

JOHN BARNES, OF ROCKFORD, ILLINOIS.

IMPROVEMENT IN HARVESTER-RAKES.

Specification forming part of Letters Patent No. 208,950, dated October 15, 1878; application filed June 12, 1878.

*To all whom it may concern:*

Be it known that I, JOHN BARNES, of the city of Rockford, in the county of Winnebago and State of Illinois, have invented a new and useful Improvement in Harvester-Rakes, of which the following is a specification:

This invention relates to that class of harvester-rakes in which the reel and rake are combined, operating to gather the grain to the cutters, deposit it on the platform as it is cut, and sweep the cut grain from the platform and deposit it in gavels.

In rakes of this class, as heretofore constructed, cams having different trackways, or provided with switches or other equivalent devices wholly or partially fixed, have been employed to control the movements of the rake, to direct it in its proper path to operate either as a reel or rake when desired. These methods are objectionable, as they increase the number of parts, and are a fruitful source of accidents, arising from the partial movement of the switch or movable part of a cam. The friction and wear of the large number of parts employed in rakes of the above description are unduly great, and hence constitute a serious defect in such machines.

In my improved combined reel and rake I employ a single-track cam without switches, in which the whole cam itself is made movable, so as to cause the rake to either discharge the grain or to perform the function of a reel.

The object of this invention is to produce an improved combined reel and rake, in which the rake is capable of use either as a reel or rake, placed under the control of the driver, to be operated in either capacity, as desired.

Figure 1:
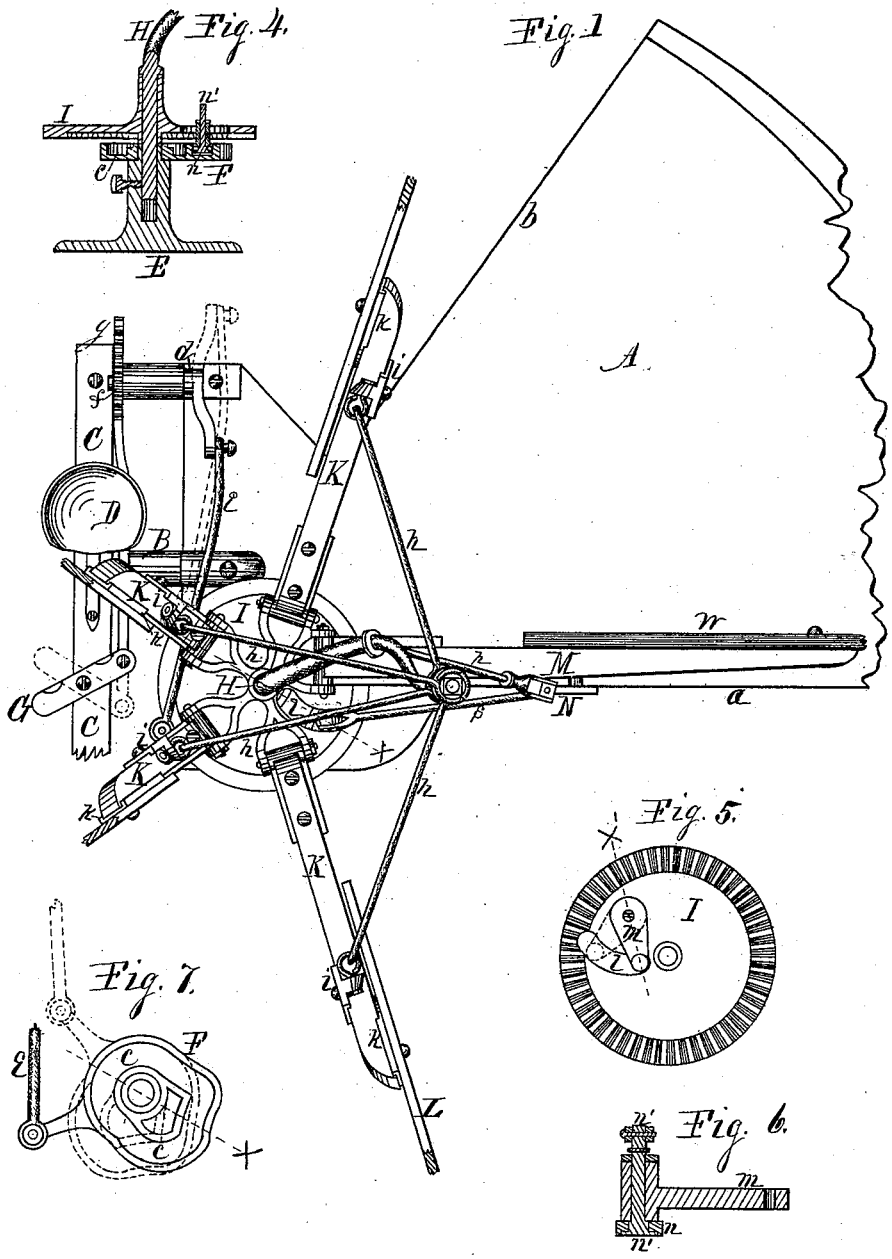
Figure 2:
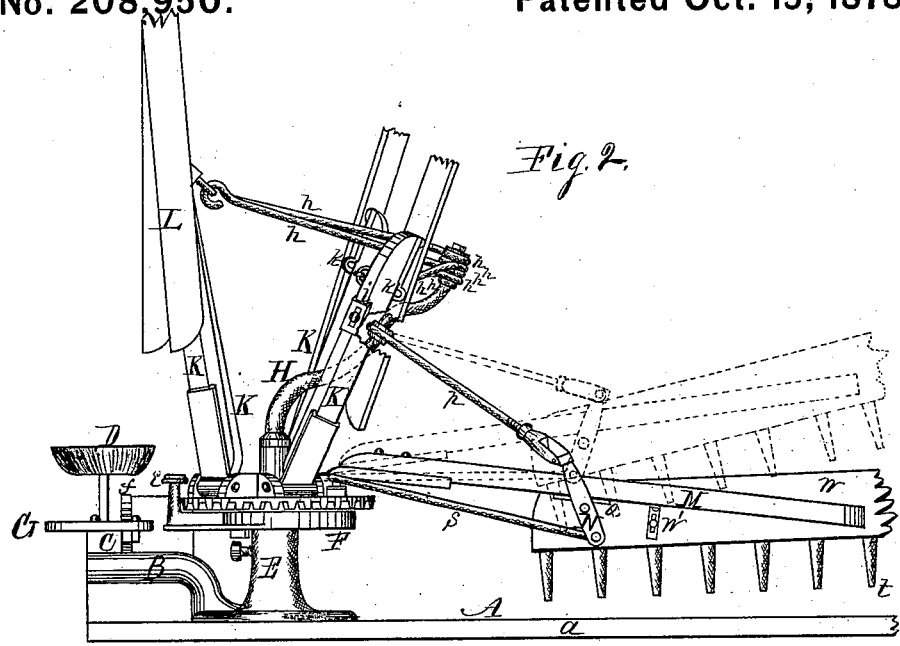

In the drawings, Figure 1 is a plan view of my improved combined reel and rake. Fig. 2 is a front elevation, and Fig. 3 an elevation as seen from the grain-wheel end, of the machine. Fig. 4 is a vertical section of the crown-wheel, cam, and supports on dotted line $x$, Fig. 1. Fig. 5 is an under face view of the crown-wheel. Fig. 6 is a vertical section of the crank-lever arm on dotted line $x'$, Fig. 5; and Fig. 7 is an upper face view of the cam.

In the drawings, A represents a portion of the horizontal platform of a harvester, in which $a$ is the cutter edge, and $b$ the delivery edge. B represents the axle-arm to receive the driving-wheel. C represents a foot-board, secured at its rear end to a bracket that rises from the main frame, and also supported on the outer end of the axle-arm. D represents the driver's seat, mounted on the foot-board. E is a pedestal, mounted on the harvester-frame in such relative position with the cutter-bar as to cause the reel and rake revolving on the pedestal to gather the grain to the cutters and discharge the cut grain in the best manner.

F represents a cam, supported on a journal-bearing on the upper portion of the pedestal, and capable of a limited oscillatory motion thereon. The upper face of this cam is provided with a grooved trackway, as shown at $c$, fitted to receive the traveler employed to control the movements of the rake. A crank-shaft, $d$, is fitted to oscillate in a journal-bearing fixed to the rear portion of the harvester-frame, and a connecting-rod, $e$, serves to connect the crank-arm with the cam in such a manner as to cause the cam to oscillate with the oscillatory movement of the crank-shaft. The crank-shaft $d$ is provided with a toothed gear-wheel, $f$, to engage the toothed rack $g$, having its forward end connected to the sway-bar G, pivoted to the foot-board in front of the driver's seat, and adapted to receive the feet of the driver, to enable him by the use of his feet to impart an oscillatory movement to the crank-shaft, which will be transmitted to the cam by means of its connection therewith.

From the foregoing it will be seen that the cam is placed under the control of the driver, to be operated in either direction within the limits of the device, as represented in the solid and dotted lines, and is employed for the purpose of controlling the movements of the rake, as will be hereinafter more fully explained.

H is a guide-post, fixed to the harvester-frame, in this instance in a pedestal secured to the frame, in which the post is held in position by set-screw or other sufficient means. That portion of the post immediately above the pedestal furnishes the journal-bearing on which the crown-wheel I revolves. The post above the crown-wheel is inclined upward and toward the platform rearward of the cutter-bar, to a point where it forms a bearing for the link which connects it with the rake, From this bearing-point it continues to incline upward and forward until at its upper end it forms the bearing for the links which connect it with the reel arms or beaters. By thus bending the post so as to form two bearing-points—one for controlling the movements of the rake, and the other for the reel arms or beaters—I am enabled to produce much better results than if both were controlled from a common center.

K represents a series of reel-arms, hinged to the upper face of the crown-wheel, to play freely vertically, and connected to the upper bearing portion of the guide-post by links $h$, made lengthwise adjustable on the reel-arms to cause them to travel in a greater or less circle, to adapt them to the different conditions and kinds of grain to be cut, so as to deposit it in the best manner on the platform. This adjustment, in this instance, is accomplished by means of the lengthwise-slotted bracket $i$, held in position on the reel-arms when adjusted by sufficient clamping-screws, which pass through the slots in the brackets. The links $h$, at their outer ends, are connected to the slotted brackets by swivel-eyes, to permit a free movement of the reel-arms and prevent cramping in the joints.

L are reel-beaters, pivoted to the reel-arms, and are made adjustable vertically thereon by means of the segment-slots in the inner ends of the brackets $k$ and clamping-bolts, which connect the beaters therewith, for the purpose of leveling the beaters when the arms are raised or lowered.

M represents a rake, which is pivoted to the upper face of the crown-wheel, substantially in the same manner as the reel-arms, which permits it to play up and down freely. The crown-wheel is provided with a radial curved slot, as at $l$, which receives the upper portion of the vertical tubular arm of the lever $m$, which is pivoted to the under face of the crown-wheel on the center from which the outlines of the curved slot is formed.

$n$ is a traveler, fitted to revolve on the center-pin $n'$, passed upward through the tubular arm, and held in place therein by a pin passing transversely through it above the tubular arm. The traveler $n$ is fitted to the grooved trackway $c$ in the upper face of the cam, which it traverses each revolution of the crown-wheel, and causes the tubular arm to move lengthwise of the curved slot, toward and from the center of the crown-wheel, to conform to the groove-trackway.

Figure 3:
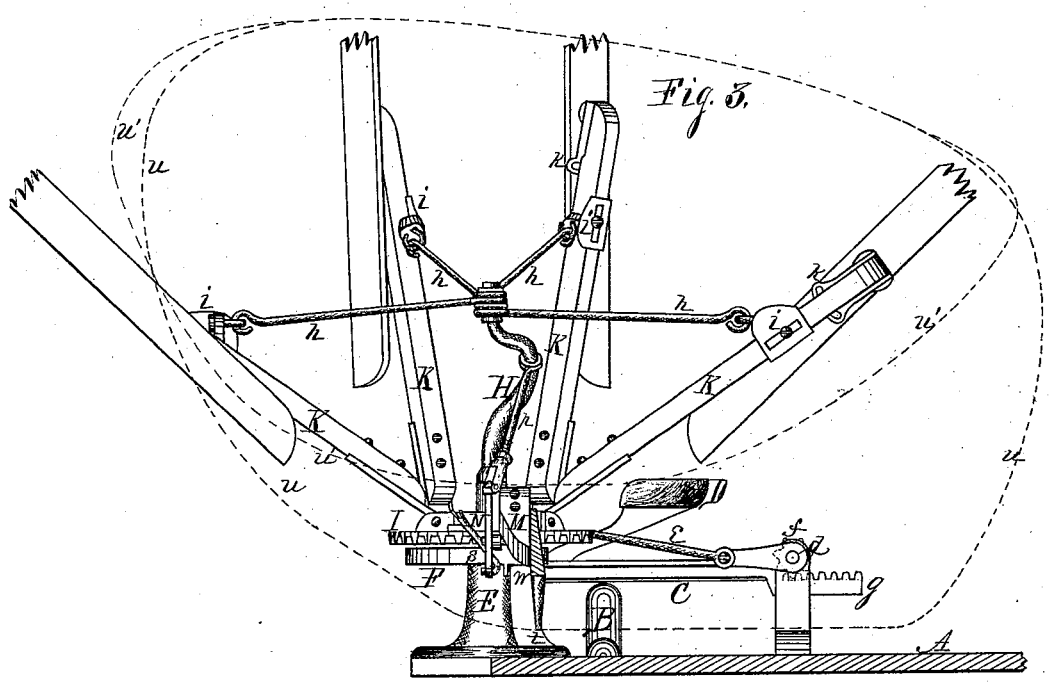

N is a sway-bar, pivoted to a plate, $o$, secured to the rake about midway of its length, which plate $o$ is made adjustable lengthwise of the rake-arm. The upper end of the sway-bar N is provided with a swivel-joint connection with the outer screw-threaded end of the link $p$, which connects it with the guide-post at a point below and rearward of the link-connections of the reel-arms, and by means of the screw-threaded connection the distance between the sway-bar and the guide-post may be changed to give the proper working length of the connecting-link. A link, $s$, serves to connect the lower end of the sway-bar N with the traveler $n$, by means of which, in connection with the link $p$, the vertical movements of the rake are controlled by the cam-trackway, which operates to increase or lessen the distance between the pivotal point of the sway-bar N and the point on the guide-post at which the link $p$ is connected, to adapt the rake to be employed either as a rake or reel-beater once in each revolution. This change from a rake to a reel-beater, or vice versa, is effected by the oscillatory movement of the cam placed under the control of the driver, as hereinbefore described; and when employed as a rake, the track of the point of the rake-tooth $t$ is indicated in Fig. 3 by the dotted line $u$, and when as a reel, its track is indicated by the dotted line $u'$. These, however, may be varied to any practical extent by the adjustment provided for, or by changing the proportions of the parts.

The rake-head $w$ is pivoted to the rake-arm, having its inner end made adjustable vertically by means of the slotted bracket $w'$ and clamping-bolt, for the purpose of leveling the rake-head.

In this instance I have preferably employed one rake-head, and in practice have found this arrangement satisfactory, but do not wish to confine myself to this single rake, as it is evident that more than one may be employed by removing the reel-arms, or some of them, and substituting therefor other rakes and connections, substantially the same as the one hereinbefore described.

The crown-wheel I is provided with a series of gear-teeth on the outer edge of its under face, adapted to engage the teeth of a suitable gear-wheel connected with the moving parts of the harvester, to impart a rotary motion to the combined rake and reel mounted thereon.

My improved combined rake and reel is capable of use on the complete harvester as now in common use, and it may be mounted on the main frame, finger-bar, or platform, or any other part of the harvester that may be found most convenient and best adapted to receive it.

From the foregoing it will be seen that in my improved revolving combined rake and reel I employ a continuous single-track camway, capable of a limited oscillatory movement, placed under the control of the driver, by means of which he may direct the course of the rake in each revolution, to operate either as a rake or reel as the cam is moved in one or the other direction—as a rake to traverse the platform to deliver the cut grain therefrom, or as a reel to traverse substantially the same track as the reel-beaters, to gather the grain to the cutters and deposit it on the platform; but the same result can be obtained by imparting to the cam an intermittent rotary motion; therefore I do not wish to limit myself to an oscillatory movement of the cam;

and, further, as it is obvious that the movable cam can be used when other devices than the link and post are substituted to control the other movements of the rake, I do not wish to limit my claim to the movable cam and rake-post.

I have represented the cam as being placed under the crown-wheel, and this I prefer; but it may be placed above the crown-wheel, which may be accomplished by constructing it with a sleeve or tubular bearing extending through and below the crown-wheel, to admit of suitable devices by which to impart to it the required movement, or in some other equivalent manner, and still be substantially the same as my invention.

I have represented the bearing of the link which connects the rake with the guide-post at a point on the post below the bearing of the links which connect the reel-beaters with the post; but evidently these bearing-points may be reversed, and the bearing-point of the reel-beater's links on the post may be below the bearing of the rake-link, without in the least departing from the spirit of my invention.

I claim as my invention—

1. The combination, with a revolving rake adapted to be employed either as a rake or a reel-beater, of a cam provided with a continuous trackway, and means for varying the position of the cam around its support, whereby the rake-head may be caused to serve as a rake to discharge the cut grain from the platform, or as a reel-beater to gather the grain to the cutters and deposit it on the platform, substantially as set forth.

2. The combination, with a revolving rake, a cam provided with a continuous trackway, and means for varying the position of the cam around its support, of a treadle located within reach of the driver and connected with the adjustable cam, so that the driver can control the position of the cam and cause the rake to operate either as a rake or reel-beater, substantially as set forth.

3. A guide-post the lower portion of which projects toward the platform, and provided at its upper end with a forwardly-projecting crank-arm, in combination with a series of revolving reel-beaters, and links connecting said beaters with the upper and forwardly-projecting portion of the guide-post, and a rake-head and link connecting the same with the bearing on the overhanging guide-post below the bearing for the reel-beaters, and nearest the platform, substantially as set forth.

4. The combination, with a revolving rake adapted to be employed either as a rake or reel-beater, of an adjustable cam provided with a continuous trackway for controlling the movement of the rake, a slotted crown-wheel, and a connecting-rod, one end being secured to a sway-bar pivoted to the rake, and the other end to a traveler which moves in the continuous trackway of the cam, and a link connecting the opposite end of the sway-bar with the guide-post, substantially as set forth.

5. The combination, with a revolving rake adapted to be employed either as a reel or rake, of a sway-bar, N, pivoted to the rake, and, by link-connection, to a guide-post, and to a traveler adapted to traverse the trackway of a movable cam, capable of movement to direct the course of the rake, to cause it to operate either as a reel or rake once in each revolution, substantially as and for the purpose hereinbefore set forth.

6. The combination, with an inclined guide-post, a revolving rake, a cam provided with a continuous trackway, and means for varying the relative position of the trackway and guide-post, of a sway-bar pivoted to the rake, and links connecting one end of said sway-bar with a traveler moving in the continuous trackway, and the other end with the guide-post, substantially as set forth.

7. The combination, with a cam provided with a continuous trackway, said cam being journaled on a suitable bearing, of a crank-shaft, one end of which connects with the cam, and the other with a sway-bar located within reach of the driver, to change the position of the cam about its axis, substantially as set forth.

8. The combination, with a series of rising and falling reel-arms rotating round a guide-post, and guided in the track of their movements by link-connection with the post, of a rake adapted to be employed either as a reel or rake, revolving round the same post with the reel-arms, and guided in the track of its movements by link-connection with the guide-post, and with a traveler actuated by the trackway of a movable cam, substantially as and for the purpose hereinbefore set forth.

JOHN BARNES.

Witnesses:
A. O. BEHEL,
JNO. W. HEPBURN.